US008753250B2

United States Patent
Mair

(10) Patent No.: US 8,753,250 B2
(45) Date of Patent: Jun. 17, 2014

(54) METHOD FOR CONTROLLING THE STARTING OF A MOTOR VEHICLE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 13/642,245

(22) PCT Filed: Mar. 2, 2011

(86) PCT No.: PCT/EP2011/053112
§ 371 (c)(1),
(2), (4) Date: Oct. 19, 2012

(87) PCT Pub. No.: WO2011/131405
PCT Pub. Date: Oct. 27, 2011

(65) Prior Publication Data
US 2013/0040780 A1    Feb. 14, 2013

(30) Foreign Application Priority Data
Apr. 22, 2010   (DE) .......................... 10 2010 028 072

(51) Int. Cl.
*F16H 59/74*        (2006.01)
(52) U.S. Cl.
USPC ......................................................... 477/99
(58) Field of Classification Search
USPC ........... 477/99, 115, 62, 174, 50, 900, 79, 80;
701/61, 54, 51, 55, 56, 62, 65, 67;
180/338, 343, 344
See application file for complete search history.

(56) References Cited

U.S. PATENT DOCUMENTS

| 6,519,522 B1 | 2/2003 | Wolf et al. |
| 6,692,406 B2 | 2/2004 | Beaty |
| 6,846,269 B2 | 1/2005 | Reuschel et al. |

(Continued)

FOREIGN PATENT DOCUMENTS

| DE | 198 39 837 A1 | 3/2000 |
| DE | 101 39 122 A1 | 3/2002 |

(Continued)

OTHER PUBLICATIONS

German Search Report Corresponding to DE 10 2010 028 282.0.

(Continued)

*Primary Examiner* — Saul Rodriguez
*Assistant Examiner* — David J Hlavka
(74) *Attorney, Agent, or Firm* — Davis & Bujold, PLLC; Michael J. Bujold

(57) ABSTRACT

A method for startup control of a motor vehicle whose drive train comprises a drive engine built as a turbo-charged internal combustion engine, an automated friction clutch, and an automatic stepped transmission, with a startup which is triggered by the activation of the gas pedal from the stationary state, after engagement of a determined startup gear. The driven engine, in conjunction with coordinated engagement of the friction clutch, is controlled from the idle speed to a startup speed and from the idle torque to a determined startup torque. To reduce the load on the friction clutch, the method provides that the lowest possible engine speed, which can be generated spontaneously under load from the idle speed depending on the dynamic operating characteristics of the drive engine and with which the drive engine can generate the determined startup torque, is determined and set as the startup speed.

16 Claims, 4 Drawing Sheets

(56) References Cited

U.S. PATENT DOCUMENTS

| | | | |
|---|---|---|---|
| 6,953,410 B2 | 10/2005 | Wheeler et al. | |
| 7,220,215 B2 | 5/2007 | Eriksson et al. | |
| 7,881,835 B2 * | 2/2011 | Denis | 701/33.9 |
| 2005/0153815 A1 | 7/2005 | Janssen | |
| 2007/0142165 A1 | 6/2007 | Klinkner et al. | |
| 2010/0185370 A1 | 7/2010 | Wurthner et al. | |
| 2011/0237393 A1 | 9/2011 | Mair | |
| 2013/0040781 A1 * | 2/2013 | Mair | 477/99 |
| 2013/0110363 A1 * | 5/2013 | Ries et al. | 701/54 |

FOREIGN PATENT DOCUMENTS

| | | |
|---|---|---|
| DE | 102 34 428 A1 | 2/2004 |
| DE | 103 30 951 A1 | 1/2005 |
| DE | 103 35 259 A1 | 2/2005 |
| DE | 10 2006 027 865 A1 | 12/2007 |
| DE | 10 2007 019 729 A1 | 10/2008 |
| DE | 10 2007 031 725 A1 | 1/2009 |
| DE | 10 2008 054 802 A1 | 6/2010 |
| EP | 1 070 625 A2 | 1/2001 |
| EP | 1 354 751 A2 | 10/2003 |

OTHER PUBLICATIONS

International Search Report Corresponding to PCT/EP2011/053109.
International Search Report Corresponding to PCT/EP2011/053113.
International Search Report Corresponding to PCT/EP2011/053112.
International Search Report Corresponding to PCT/EP2011/053114.
Written Opinion Corresponding to PCT/EP2011/053109.
Written Opinion Corresponding to PCT/EP2011/053113.
Written Opinion Corresponding to PCT/EP2011/053112.
Written Opinion Corresponding to PCT/EP2011/053114.

* cited by examiner

METHOD FOR CONTROLLING THE STARTING OF A MOTOR VEHICLE

This application is a National Stage completion of PCT/EP2011/053112 filed Mar. 2, 2011, which claims priority from German patent application serial no. 10 2010 028 072.0 filed Apr. 22, 2010.

FIELD OF THE INVENTION

The invention relates to a method for startup control of a motor vehicle, the drive train of which comprises a drive engine built as a turbo-charged internal combustion engine, a startup element which is built as an automated friction clutch, and a transmission which is built as an automatic stepped transmission, wherein with a startup from the stationary state triggered by the activation of the gas pedal, the drive engine in conjunction with a coordinated engagement of the friction clutch is controlled from the idle speed to a startup speed and from the idle torque to a determined startup torque after engagement of a determined startup gear.

BACKGROUND OF THE INVENTION

In motor vehicles, there has been increasing use of automatic stepped transmissions with at least one automated friction clutch as a startup element, in which the gear selection, the triggering of shift operations, the engaging and disengaging of gear steps, and the engaging and disengaging of the friction clutch are automated; that is, these operations occur by evaluating operating parameters in a transmission control device and the drive assigned to the control.

For startup from standstill, the friction clutch can be a passively engageable single or multi-disc dry clutch, or an actively engageable multi-disc clutch for bridging the speed difference between the engine speed and the transmission input speed (speed at the input shaft of the stepped transmission) in slipping operation, until the motor vehicle has accelerated and synchronous running arises at the friction clutch and the clutch can be completely engaged.

The startup-dependent slipping operation represents a large thermal and mechanical load for the friction clutch, which increases with the value of the startup torque, the value of the slip speed and the duration of the slipping phase, and which forms an essential parameter for determining the startup gear.

In addition, the engine torque (startup torque) that can be delivered by the drive engine must be sufficiently high to overcome the stationary drive resistance of the motor vehicle (rolling resistance plus incline resistance) with the overall transmission ratio determined by the selected startup gear and the efficiency of the drive train, as well as to enable additionally at least a minimal startup acceleration of the motor vehicle (dynamic drive resistance).

It must also be considered during startup that active output drive-side power take-offs, that is, power take-offs disposed at the transmission and/or the axle transmission that reduce the engine torque which can be used for startup, can be considered as a fictonal additional resistance for the determination of the startup gear. In contrast, auxiliary consumers driven directly by the drive engine such as an electric generator, a servo pump of a servo steering, and an air conditioning compressor of an air conditioning system, as well as active drive-side power take-offs, that is, disposed directly at the drive engine, already reduce at the source of the torque, the engine torque that can be delivered by the drive engine to the friction clutch and that is available for startup.

In order to avoid many sequential shift procedures associated in each case with an interruption of tractive force, it is generally desirable to perform the startup of a motor vehicle in as high a gear step as possible, however without thermal overload of the friction clutch in the process.

Thus, a method for determining a startup gear is known from the documents DE 198 39 837 A1 and U.S. Pat. No. 6,953,410 B2, with which the highest possible startup gear is determined from the present drive resistance of the motor vehicle and the available engine torque of the drive train so that the expected duration of slipping of the friction clutch during the startup and/or the thermal energy created in friction clutch in slipping operation do not exceed predetermined limit values.

The document U.S. Pat. No. 7,220,215 B2 describes a commercial vehicle with a control device with which the highest possible startup gear is determined so that the maximal engine torque that can be generated by the drive engine with the idle speed is attained for the startup, and in the process the thermal energy created in the friction clutch does not exceed a predetermined limit value.

The typical method process for determining a startup gear as well as the startup torque and the startup speed of the drive engine can be found in DE 10 2007 019729 A1. An alternate method for determining a startup gear according to the document DE 10 2007 031 725 A1, with which the laborious use of characteristic curves and characteristic maps is avoided in its application, provides that a minimum startup transmission ratio is calculated from the present drive resistance, the available engine torque and an assumed minimum startup acceleration, and the highest possible startup gear is determined therefrom.

Particularly in the case of commercial vehicles, the drive engines are usually designed as diesel engines that can be loaded by a turbo-charger, which have a specific load build-up characteristic. As described in detail in the document DE 10 2008 054 802.2, which was previously unpublished, and which describes a method for controlling an automatic stepped transmission depending on the dynamic operating characteristics of a turbo-charged internal combustion engine, a turbo-charged internal combustion engine can spontaneously, that is with high torque gradients, only reach an intake torque lying below the full load torque. A further increase of the engine torque is possible, although with low torque gradients, only briefly above a boost threshold speed, after which the turbo-charger creates a significant increase of the charge pressure and thus the engine torque. Thus aside from the idle speed, cut-off speed and the full load torque characteristic curve, the dynamic behavior of a turbo-charged internal combustion engine is also determined by the boost threshold speed and the intake torque characteristic curve as well as by the present torque gradients, at least in certain regions.

With the previously known methods for startup control of motor vehicles, the dynamic operating characteristics of the drive engines were considered only indirectly using characteristic curves and characteristic maps that are laborious to apply and correspondingly inexact. This can have the consequence that the startup torque necessary for startup is set with an engine speed (startup speed) that is too high, which causes an increased thermal and mechanical load of the friction clutch due to the high slipping speed. Likewise, an engine speed (startup speed) that is too low for the startup can be set, with which the startup torque required for startup cannot be spontaneously generated by the drive engine such that either the startup procedure must be aborted, or a shift into a lower startup gear must occur during the startup, or the startup torque is achieved only greatly delayed with prolonging the slipping phase of the friction clutch.

SUMMARY OF THE INVENTION

Therefore, problem addressed by the invention is to propose a method for startup control of a motor vehicle of the initially named type with which the dynamic operating characteristics of a drive engine built as a turbo-charged internal combustion engine are directly considered.

This problem is solved according to the invention, in that depending on the dynamic operating characteristics of the drive engine, the lowest possible engine speed which can be spontaneously set under load from the idle speed $n_{idle}$ and with which the drive engine can generate the determined startup torque, is calculated and set as the startup speed.

Accordingly, the invention assumes a known motor vehicle, a commercial vehicle for example, the drive train of which comprises a drive engine built as a turbo-charged internal combustion engine, a startup element built as an automated friction clutch, and a transmission built as an automatic stepped transmission. With an active startup from standstill, which is triggered by the actuation of the gas pedal by the driver, and which occurs on a plane or an incline, the internal combustion engine, with an initially disengaged friction clutch, is controlled after the engagement of a determined startup gear in conjunction with the coordinated engagement of the friction clutch from the idle speed $n_{idle}$ to a startup speed $n_{Anf}$ and from the idle torque $M_{idle}$ to a determined startup torque $M_{Anf}$ until the motor vehicle has accelerated to the extent that the friction clutch runs synchronously and can be completely engaged. The further control of the startup engine and the stepped transmission occurs then depending on the gas pedal setting and/or on the change gradients of the gas pedal setting.

The method according to the invention for the startup control now provides a direct consideration of the dynamic operating characteristics of the drive engine specifically in a manner such that the lowest possible engine speed $n_M$, which can be set spontaneously under load from the idle speed $n_{idle}$, and with which the drive engine can generate the determined startup torque $M_{Anf}$, is determined and set as the startup speed $n_{Anf}$.

Thus, startup occurs with the lowest possible engine speed $n_M$ or the lowest possible slipping speed at the friction clutch ($\Delta n_K = n_M - n_{GE}$), with which the startup torque $M_{Anf}$ necessary for startup can be spontaneously built up and delivered by the drive engine. Therefore the startup under normal operating conditions is in most cases as problem-free as possible, and in each case occurs with the lowest possible thermal and mechanical load of the friction clutch.

The data which represents the dynamic operating characteristics of the internal combustion engine can be taken either directly from the engine control device or from a data store of the transmission control device. As already described in the document DE 10 2008 054 802.2, the relevant data that corresponds to the vehicle configuration, can be transferred to the data store of the transmission control device at the end of the production line of the motor vehicle, and during later travel operation can be adapted through comparison with the current operating data, particularly of the drive engine, that is, adapted to the changed operating characteristics. By accessing such updated data, the present procedure for the startup control is automatically adapted to the changed operating characteristics of the motor vehicle or of the drive engine.

Corresponding to the named method strategy, when the determined startup torque $M_{Anf}$ does not exceed the intake torque $M_S$ of the drive engine, ($M_{Anf} \leq M_S$), the idle speed $n_{idle}$ of the drive engine or an engine speed lying slightly above ($n_M = n_{idle} + \Delta n_M$) the idle speed $n_{idle}$ is determined and set as the startup speed $n_{Anf}$, thus ($n_{Anf} = n_{idle}$; $n_{Anf} = n_{idle} + \Delta n_M$), because the idle speed $n_{idle}$ in this case is the lowest possible engine speed with which the startup torque $M_{Anf}$ can be spontaneously set at the drive engine.

The intake torque $M_S$ of the drive engine is presently considered constant in accordance with practice; in the case of greater deviations, it can also be treated as a function ($M_S = f(n_M)$) of the engine speed $n_M$ without any adverse effect on the method. The speed increase $\Delta n_M$ can be on the order of magnitude of 50 $\text{min}^{-1}$ to 100 $\text{min}^{-1}$, and serves for improved running of the drive engine and as a control reserve for avoiding a reduction of the engine speed $n_M$ below the idle speed $n_{idle}$, and therefore to avoid a consequential stalling of the drive engine. When lower startup torque ($M_{Anf} < M_S$) is present, however, the higher intake torque $M_S$ can still be set as the startup torque $M_{Anf}$, thus ($M_{Anf} = M_S$), because the negative effect of the higher startup torque $M_{Anf}$ with respect to the load of the friction clutch is compensated by the positive effect of the shorter duration of slipping.

However, under certain operating conditions such as an activated extinguisher pump of a fire engine (extinguishing during slow travel) or an active concrete pump of a concrete mixer for depositing a concrete caterpillar, the drive engine must be held at a minimum speed $n_{min}$ which lies above the idle speed $n_{idle}$, thus ($n_{min} > n_{idle}$). In this case, that is, with an operation-dependent minimum speed $n_{min}$ to be maintained by the drive engine which lies above the idle speed $n_{idle}$ of the drive engine, thus ($n_{min} > n_{idle}$), a development of the method provides that this minimum speed $n_{min}$ or an engine speed lying slightly above the minimum speed $n_{min}$, thus ($n_M = n_{min} + \Delta n_M$), is determined and set as the startup speed $n_{Anf}$, thus ($n_{Anf} = n_{min}$; $n_{Anf} = n_{min} + \Delta n_M$), if the determined startup torque $M_{Anf}$ does not exceed the intake torque $M_S$ of the drive engine, thus ($M_{Anf} \leq M_S$).

However if the determined startup torque $M_{Anf}$ exceeds the intake torque $M_S$ of the drive engine, thus ($M_{Anf} > M_S$), it is provided according to the invention that the drive engine is initially accelerated up to the boost threshold speed $n_{L\_min}$ or an engine speed $n_M$ lying slightly above the boost threshold speed $n_{L\_min}$, thus ($n_M = n_{L\_min}$; $n_M = n_{L\_min} + \Delta n_M$), and is loaded up to the intake torque $M_S$, and then is loaded at a largely constant engine speed ($n_M \approx n_{L\_min}$) up to nearly the full load torque $M_{VL}(n_{L\_min})$, and that the further speed progression of the drive engine occurs depending on the deviation of the present engine torque ($M_M \approx M_{VL}(n_{L\_min})$) from the determined startup torque $M_{Anf}$.

The acceleration of the drive engine up to the boost threshold speed $n_{L\_min}$ or an engine speed lying above the boost threshold speed $n_{L\_min}$ by a speed increase $\Delta n_M$ of approximately 50 $\text{min}^{-1}$ to 100 $\text{min}^{-1}$ is necessary in this case, thus ($n_M = n_{L\_min} + \Delta n_M$), because a rapid further increase of the engine torque $M_M$ is possible only above the boost threshold speed $n_{L\_min}$. The optional speed increase $\Delta n_M$ serves as a control reserve to compensate for signal inaccuracies and disruptions, by means of which a decrease of the engine speed $n_M$ below the boost threshold speed $n_{L\_min}$ and a consequently caused reduction of the engine torque $M_M$ to the intake torque $M_S$ are avoided.

After attaining the full load torque $M_{VL}(n_{L\_min})$, the drive engine is held at the present engine speed ($n_M = n_{L\_min}$; $n_M = n_{L\_min} + \Delta n_M$) and the present engine torque ($M_M \approx M_{VL}(n_{L\_min})$) during the slipping phase of the friction clutch, if the present engine torque $M_{VL}(n_{L\_min})$ corresponds largely to the determined startup torque $M_{Anf}$, thus ($M_{Anf} \approx M_{VL}(n_{L\_min})$).

This procedure is advantageous also at lower startup torque ($M_S < M_{Anf} < M_{VL}$) because it is difficult to regulate the engine torque $M_M$ in this range with a decreasing slipping speed $\Delta n_K$ at the friction clutch, and therefore with the occurrence of torque fluctuations there is a risk of falling below the boost threshold speed $n_{L\_min}$ and of a decrease of the engine torque $M_M$ to the intake torque $M_S$. In addition the negative effect with respect to the load of the friction clutch due to the increased startup torque ($M_{Anf} \approx M_{VL}(n_{L\_min})$) is compensated by the positive effect of the shorter duration of slipping.

If however, the present engine torque $M_{VL}(n_{L\_min})$ lies significantly above the determined startup torque $M_{Anf}$, thus ($M_{Anf} < M_{VL}(n_{L\_min})$), the drive engine is pushed along the full load characteristic curve $M_{VL}(n_M)$ to a lower engine speed ($n_M < n_{L\_min}$) and lower engine torque ($M_M < M_{VL}(n_{L\_min})$) by further engagement of the friction clutch, because the load of the friction clutch is significantly reduced by the thusly reduced startup speed $n_{Anf}$ and the reduced startup torque $M_{Anf}$. Because the reduction of the startup speed $n_{Anf}$ and the startup torque $M_{Anf}$ at full load of the drive engine occurs only due to a moderate increase of the torque $M_K$ transferred by the friction clutch, there is no reduction of the engine torque $M_M$ to the intake torque $M_S$. During operation of a turbo-charged internal combustion engine at the full load limit given by the full load characteristic curve thereof, the system formed by the internal combustion engine and the turbo-charger is stable. Accordingly, the charge pressure of the internal combustion engine is not reduced with reducing engine speed $n_M$, and there is no reduction of the engine torque $M_M$ to the intake torque $M_S$.

In contrast, if the present engine torque $M_{VL}(n_{L\_min})$ lies significantly below the determined startup torque $M_{Anf}$, thus ($M_{Anf} > M_{VL}(n_{L\_min})$), the drive engine is set to a higher engine speed ($n_M > n_{L\_min}$) and higher engine torque ($M_M > M_{VL}(n_{L\_min})$) by an increase of the engine power and a further engagement of the friction clutch, to be able to perform the startup procedure with the intended startup acceleration and a limited load of the friction clutch.

The operation of drive-side power take-offs, in particular, can require the drive engine maintaining a maximum speed $n_{max}$ lying below the intended startup speed $n_{Anf}$ ($n_{max} < n_{Anf}$), such that without adaptive measures, the drive engine cannot attain the engine torque $M_M$ required for a startup. A startup is, in principle, possible when the engine torque $M_M$ present at the friction clutch at least slightly exceeds the drive resistance torque $M_{FW}$, thus ($M_M > M_{FW}$), which can be determined by the back calculation of the drive resistance given the overall transmission ratio and the efficiency of the drive train on the input shaft, for enabling a minimal startup acceleration. To guarantee this, it is presently provided that with an operation-dependent maximum speed $n_{max}$ to be maintained by the drive engine that is lower than the intended startup speed $n_{Anf}$ of the drive engine, ($n_{max} < n_{Anf}$), a modification of the startup speed $n_{Anf}$ and/or the startup torque $M_{Anf}$ and/or the startup gear occurs.

Thus, it is possible that the startup is performed with the intended startup gear while maintaining the maximum speed $n_{max}$, if the maximum engine torque $M_M(n_{max})$ that can be set with the maximum speed $n_{max}$ is sufficient for the startup, thus ($M_M(n_{max}) > M_{FW}$).

In contrast, if the maximum engine torque $M_M(n_{max})$ that can be set with the maximum speed $n_{max}$ in conjunction with the originally intended startup gear is not sufficient for startup while maintaining the maximum speed $n_{max}$, ($M_M(n_{max}) \leq M_{FW}$), it is preferred to shift into a lower startup gear before beginning the startup procedure, and to perform the startup with this startup gear.

As an alternative or supplement to this, the engine torque $M_M$ available for overcoming the startup resistance and for allowing at least a minimum startup acceleration can also be increased in that at least one auxiliary consumer and/or a power take-off is decoupled if the maximum engine torque $M_M(n_{max})$ that can be set with the maximum speed $n_{max}$ is not sufficient for the startup, thus ($M_M(n_{max}) \leq M_{FW}$).

If such measures for allowing a startup are not sufficient it can also be provided that the assembly requiring the maximum speed $n_{max}$ to be maintained is switched off temporarily, for example for the duration of the slipping phase or until the end of the first upshift, if the maximum engine torque $M_M(n_{max})$ that can be set with the maximum speed $n_{max}$ is not sufficient for the startup, thus ($M_M(n_{max}) \leq M_{FW}$).

If the maximum engine torque $M_M(n_{max})$ that can be set with the maximum speed $n_{max}$ is not sufficient for the startup, thus ($M_M(n_{max}) \leq M_{FW}$), it can also be provided in this case that the maximum speed $n_{max}$ is temporarily exceeded.

The startup control according to at least one of the named method features can without restriction also be applied to the portion of the startup torque $M_{Anf}$ generated by the internal combustion engine in a motor vehicle provided with a parallel hybrid drive or with a boost drive, if during startup in addition to the internal combustion engine the respective parallel drive or the boost drive is used, which in each case can be built as an electric motor or an inertia type drive for example.

If the internal combustion engine has a variable engine characteristic, which can be given by an activatable pressure boost system (PBS) with pressurized air injection into the intake tract of the drive engine, for instance, the startup control can be expediently modified according to at least one of the named method features to the respectively present engine characteristic. If, for example, with an activated PBS, the boost threshold speed $n_{L\_min}$ is reduced to the idle speed $n_{idle}$, or below the idle speed $n_{idle}$, thus ($n_{L\_min} \leq n_{idle}$), this means that according to the strategy of the method according to the invention the idle speed $n_{idle}$ of the drive engine, or an engine speed lying slightly above the idle speed $n_{idle}$, ($n_M = n_{idle} + \Delta n_M$) is determined as the startup speed $n_{Anf}$, thus ($n_{Anf} = n_{idle}$; $n_{Anf} = n_{idle} + \Delta n_M$), and the respective full load torque $M_{VL}(n_{idle})$ is set, ($n_{Anf} = n_{idle}$; $n_{Anf} = n_{idle} + \Delta n_M$), if the determined startup torque $M_{Anf}$ does not exceed the full load torque $M_{VL}(n_{idle})$ of the drive engine, thus ($M_{Anf} \leq M_{VL}(n_{idle})$). If the respective full load torque $M_{VL}(n_{idle})$ still lies below the determined startup torque $M_{Anf}$, thus ($M_{Anf} > M_{VL}(n_{idle})$), the drive engine in a manner analogous to the previously described procedure is set along the full load characteristic curve $M_{VL}(n_M)$ to a higher engine speed ($n_M > n_{idle}$) and higher engine torque ($M_M > M_{VL}(n_{idle})$), by an increase of the engine power and further engagement of the friction clutch, to attain the intended startup torque $M_{Anf}$, thus ($M_M = M_{Anf}$).

BRIEF DESCRIPTION OF THE DRAWINGS

In order to illustrate the invention, the description is accompanied by a drawing with an example embodiment. The figures show.

DETAILED DESCRIPTION OF THE PREFERRED EMBODIMENTS

Figure 6:
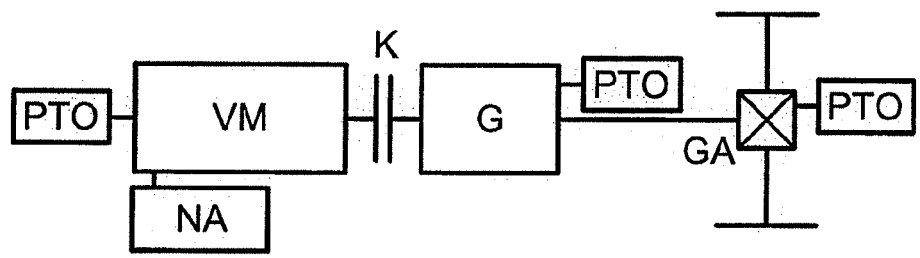

A drive train, shown schematically in FIG. 6, of a heavy commercial vehicle comprises a drive engine designed as a turbo-charged internal combustion engine VM, a startup element designed as an automated friction clutch K, and a transmission designed as an automated stepped transmission G. The stepped transmission G can be connected on the input side, via the friction clutch K, to the drive shaft (crankshaft) of the internal combustion engine VM, and on the output side, via a cardan shaft, to the axle transmission GA (axle differential) of the drive axle.

At least one auxiliary consumer NA and, optionally, at least one drive-side power take-off PTO are disposed at the internal combustion engine VM, which in the driven state reduce the engine torque $M_M$ of the internal combustion engine VM that can be delivered at the friction clutch and that is available for a startup process. At least two further output-side power take-off-offs PTO are disposed at the stepped transmission G and the axle transmission GA, and further reduce the engine torque $M_M$ transmitted via the friction clutch K into the stepped transmission G and or, respectively, into the axle transmission GA, such that with a startup procedure correspondingly reduced torque is effective at the drive wheels of the drive axle for overcoming the drive resistance and attaining an at least minimal startup acceleration.

With a startup procedure, the internal combustion engine VM must therefore be able to briefly generate engine torque $M_M$ and to deliver the torque at the friction clutch K so that such torque, minus the drive torque for the auxiliary consumers NA and the drive side power take-offs PTO, is sufficient for attaining acceptable startup acceleration. For this purpose, the engine torque $M_M$ transferred by the friction clutch K must be sufficiently high that, minus the drive torques for the output drive side power take-off PTO, the engine torque exceeds the drive resistance torque resulting from the present drive resistance, that is, the reduced drive resistance torque $M_{FW}$ given the overall transmission ratio and the efficiency of the drive train at the input shaft of the stepped transmission G, exceeds to such a degree that the excess torque is sufficient at least for a minimal startup acceleration.

With the present invention, the methods for determining a startup gear suitable for this purpose and the necessary startup torque $M_{Anf}$ are assumed to be known. In contrast, the method according to the invention is concerned with how, with a startup procedure from standstill triggered by the actuation of the gas pedal, the drive engine is controlled after the engagement of a determined startup gear in conjunction with a coordinated engagement of the friction clutch K, from the idle speed $n_{idle}$ to a startup speed $n_{Anf}$ and from the idle torque $M_{idle}$ to the determined startup torque $M_{Anf}$.

According to the invention this occurs depending on the dynamic operating characteristics of the drive engine such that the lowest possible engine speed $n_M$ that can be spontaneously realized, and with which the drive engine can generate the determined startup $M_{Anf}$ torque, is determined and set as the startup speed $n_{Anf}$.

Figure 7:
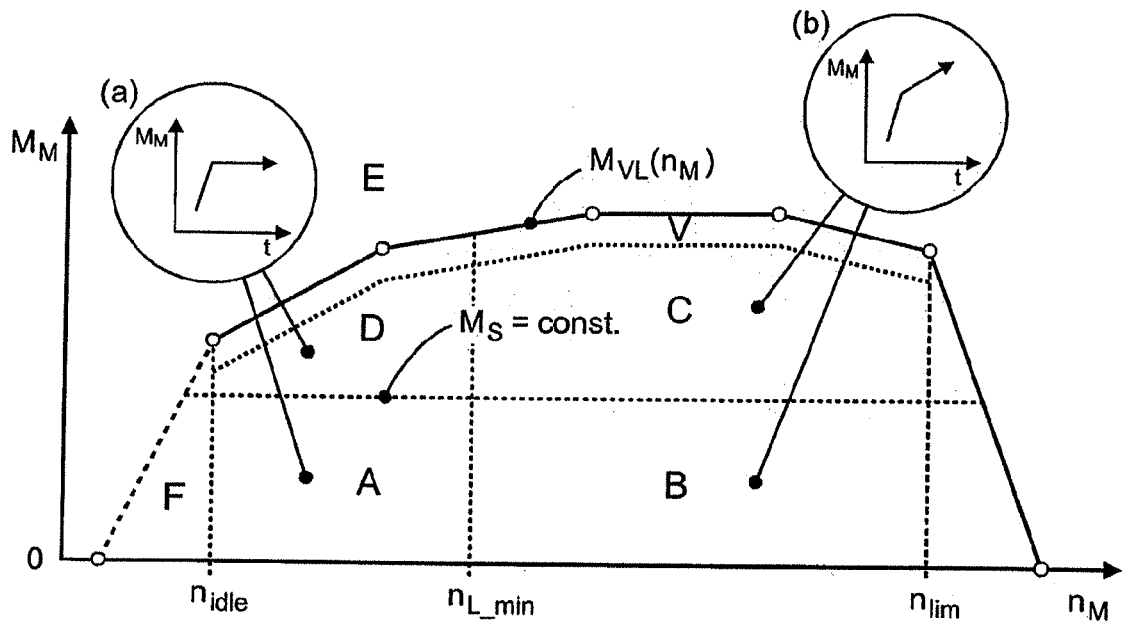

The dynamic operating characteristics of the drive engine built as a turbo-charged internal combustion engine VM can be taken from the engine dynamic characteristic map known from the document DE 10 2008 054 802.2, which can be stored in the data store of the transmission control device and is shown for example in FIG. 7.

The engine dynamic characteristic map represented in FIG. 7 in a torque/speed diagram contains the immediately available maximum torque $M_{max}$ of the internal combustion engine VM and the maximum torque gradient $(dM_M/dt)_{max}$, with which the immediately available maximum torque $M_{max}$ of the internal combustion engine VM can be attained as quickly as possible, in each case of a function of the present engine torque $M_M$ and the present engine speed $n_M$, thus ($M_{max}=f(M_M, n_M)$, $(dM_M/dt)_{max}=f(M_M, n_M)$).

The engine dynamic characteristic map according to FIG. 7 is bounded by the stationary full load torque characteristic curve $M_{VL}(n_M)$, the zero torque curve ($M_M=0$), the idle speed $n_{idle}$ and the cut-off speed $n_{lim}$ of the internal combustion engine VM. The engine dynamic characteristic map is subdivided into four operating regions A, B, C, D by the intake torque characteristic curve $M_S(n_M)$ of the intake torque, simplified here as assumed to be constant $M_S$=const., and the boost threshold speed $n_{L\_min}$ of the internal combustion engine VM.

In the first region A ($0 \leq M_M < M_S$, $n_{idle} \leq n_M < n_{L\_min}$) that is below the intake torque characteristic curve $M_S$=const. and below the boost threshold speed $n_{L\_min}$, the immediately available maximum torque $M_{max}(n_M)$ of the internal combustion engine VM is formed in each case by the corresponding value of the intake torque $M_S$, thus ($M_{max}(n_M)=M_S$). However, as the intake torque $M_S$ in this region is constant ($M_S$=const.), the immediately available maximum torque $M_{max}$ of the internal combustion engine VM is represented by a single value ($M_{max}=M_S$=const.). Independent of this, the very high maximum torque gradient $(dM_M/dt)_{max}$ in operating region A can also be given by a single value.

In the second region B ($0 \leq M_M < M_S$, $n_{L\_min} \leq n_M \leq n_{lim}$) lying below the intake torque characteristic curve $M_S$=const. and above the boost threshold speed $n_{L\_min}$, the immediately available maximum torque $M_{max}(n_M)$ of the internal combustion engine VM is similarly given in each case by the corresponding value of the intake torque $M_S$. Because the intake torque $M_S$ has a constant progression ($M_S$=const.) also in this region, the immediately available maximum torque $M_{max}$ of the internal combustion engine VM in the region B is also represented by a single value ($M_{max}=M_S$=const.). As with region A, also in region B, the maximum torque gradient $(dM_M/dt)_{max}$ that is also very high beneath the intake torque characteristic curve $M_S$=const. can be expressed by a single value.

In the third region C ($M_S \leq M_M < M_{VL}(n_M)$, $n_{L\_min} \leq n_M \leq n_{lim}$), adjacent to region B, and lying above the intake torque characteristic curve $M_S$=const. and above the boost threshold speed $n_{L\_min}$, a further increase of the engine torque $M_M$ is possible up to the respective value of the stationary full load torque characteristic curve $M_{VL}(n_M)$, however, with a significantly lower maximum torque gradient $(dM_M/dt)_{max}$ than in the regions A and B, i.e., below the intake torque characteristic curve $M_S$=const.

In the fourth region D ($M_S \leq M_M < M_{VL}(n_M)$, $n_{idle} \leq n_M < n_{L\_min}$), adjoining at the first region A, above the intake torque characteristic curve $M_S$=const. and below the boost threshold speed $n_{L\_min}$, a further rapid increase of the engine torque $M_M$ is not possible without an increase of the engine speed $n_M$ above the boost threshold speed $n_{L\_min}$. Consequently, in operating region D, the immediately available maximum torque $M_{max}(n_M)$ of the internal combustion engine VM equals the corresponding value of the intake torque $M_S(M_{max}(n_M)=M_S$=const.) and the maximum torque gradient $(dM_M/dt)_{max}$ equals zero, thus $((dM_M/dt)_{max}=0)$.

An operating region E, which cannot be attained in normal driving operation, is defined above the full load torque characteristic curve $M_{VL}(n_M)$. Below the full load torque characteristic curve $M_{VL}(n_M)$ and the idle speed $n_{idle}$, there is an undesirable but technically attainable operating region F, into which the internal combustion engine VM can be pushed dynamically from an engine speed $n_M$ lying near the idle speed $n_{idle}$, for example by a rapid engagement of the friction clutch K, and in which there is a danger of stalling the internal combustion engine VM. In addition, a nearby region lying immediately below the full load torque characteristic curve $M_{VL}(n_M)$ can be defined as an additional operating region V, in which the internal combustion engine VM under full load, that is along the full load torque characteristic curve $M_{VL}(n_M)$, can be pushed to a lower engine speed $n_M$ or controlled to a higher engine speed $n_M$. Within the operating region V, the engine speed $n_M$ can also be pushed below the boost threshold speed $n_{L\_min}$ without the charge pressure of the internal combustion engine collapses and declines to the intake torque $M_S$.

Figure 8A:
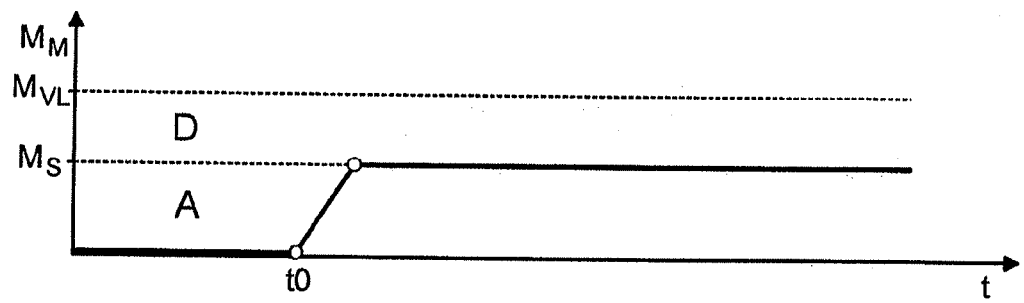

For the startup procedures considered here, with which the drive engine is to be controlled from the idle speed $n_{idle}$ to a startup speed $n_{Anf}$ and from the idle torque $M_{idle} \approx 0$ to the determined startup torque $M_{Anf}$, it must accordingly be noted that the drive engine can be spontaneously loaded, that is, with high torque gradients $dM_M/dt$, only up to the intake torque $M_S$, if the engine speed $n_M$ remains below the boost threshold speed $n_{L\_min}$. This relationship is represented greatly simplified in the torque progression $M_M(t)$ in the image insert (a) of FIG. 7 and in the time progression of FIG. 8a.

Figure 8B:
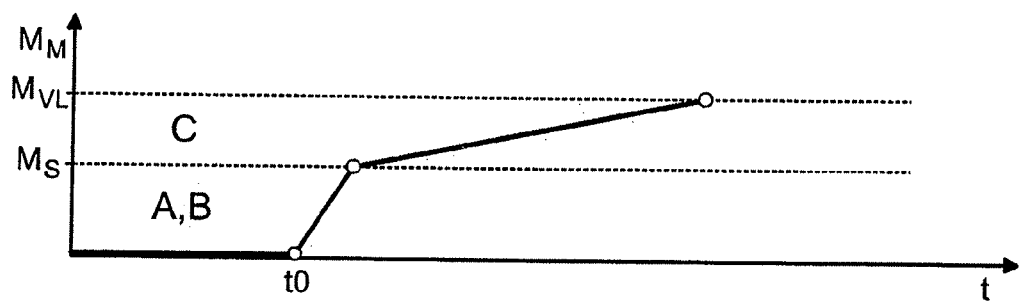

Likewise it is to be noted for the present startup control that the drive engine must be accelerated above the boost threshold speed $n_{L\_min}$ for the immediate setting of an engine torque $M_M$ lying above the intake torque $M_S$, thus it must be controlled from the operating region A into the operating region B or C, because a further rapid increase of the engine torque $M_M$ is possible only above the boost threshold speed $n_{L\_min}$, even with lower torque gradients $dM_M/dt$. This relationship is illustrated in a greatly simplified manner in the torque progression $M_M(t)$ in the image insert (b) of FIG. 7 and in the time progression of FIG. 8b.

Figure 1:
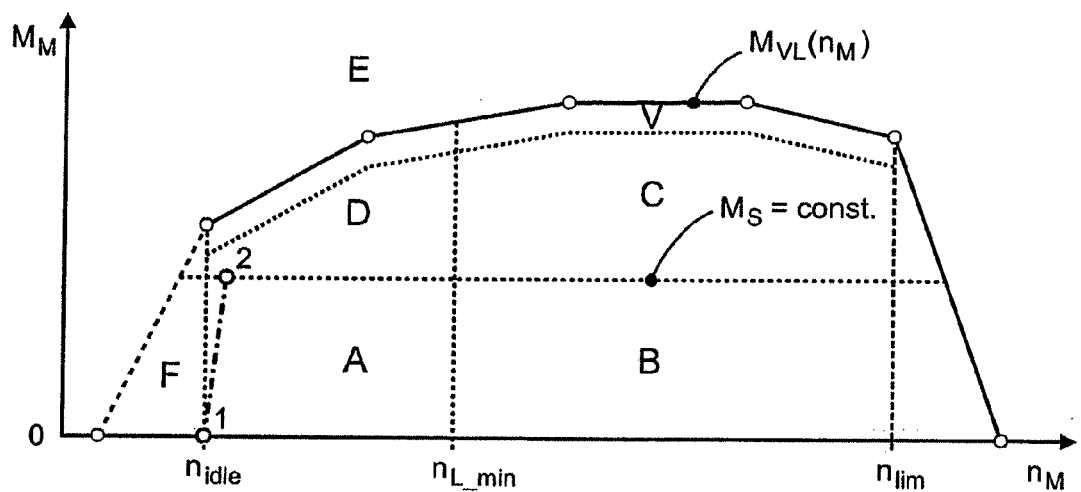
FIG. 1 a speed and torque control according to the invention in a engine characteristic curve during a startup procedure with startup torque lying below the engine intake torque of the drive engine, ($M_{Anf} \leq M_S$), FIG. 2 relevant speed and torque progressions during a startup procedure according to FIG. 1, FIG. 3 a speed and torque control according to the invention in an engine characteristic curve during a startup procedure with startup torque lying above the engine intake torque, ($M_{Anf} > M_S$), FIG. 4 relevant speed and torque progressions during a startup procedure according to FIG. 3, FIG. 5 an engine characteristic map of a turbo-charged internal combustion engine provided with a pressure boost system, FIG. 6 schematic of a drive train of a heavy commercial vehicle, FIG. 7 an engine dynamic characteristic curve of a turbo-charged internal combustion engine, FIG. 8a the torque build-up of an internal combustion engine according to FIG. 7 with an engine speed controlled below the boost threshold speed, thus ($n_M \leq n_{L\_min}$), and FIG. 8b the torque build-up of an internal combustion engine according to FIG. 7 with an engine speed controlled above the boost threshold speed, thus ($n_M > n_{L\_min}$).

Accordingly, in the present method for startup control according to the invention it is provided that the idle speed $n_{idle}$ of the drive engine or an engine speed lying slightly above the idle speed $n_{idle}$, $(n_M=n_{idle}+\Delta n_M)$, is determined and set as the startup speed $n_{Anf}$ thus $(n_{Anf}=n_{idle}; n_{Anf}=n_{idle}+\Delta n_M)$, if the determined startup torque $M_{Anf}$ does not exceed the intake torque $M_S$ of the drive engine, $(M_{Anf} \leq M_S)$. A corresponding speed and torque control of the internal combustion engine VM is shown in FIG. 1 in an engine dynamic characteristic map according to FIG. 7 and in FIGS. 2a) and b) with the respective time progressions of the engine speed $n_M$, the transmission input speed $n_{GE}$ and the engine torque $M_M$.

Figure 2:
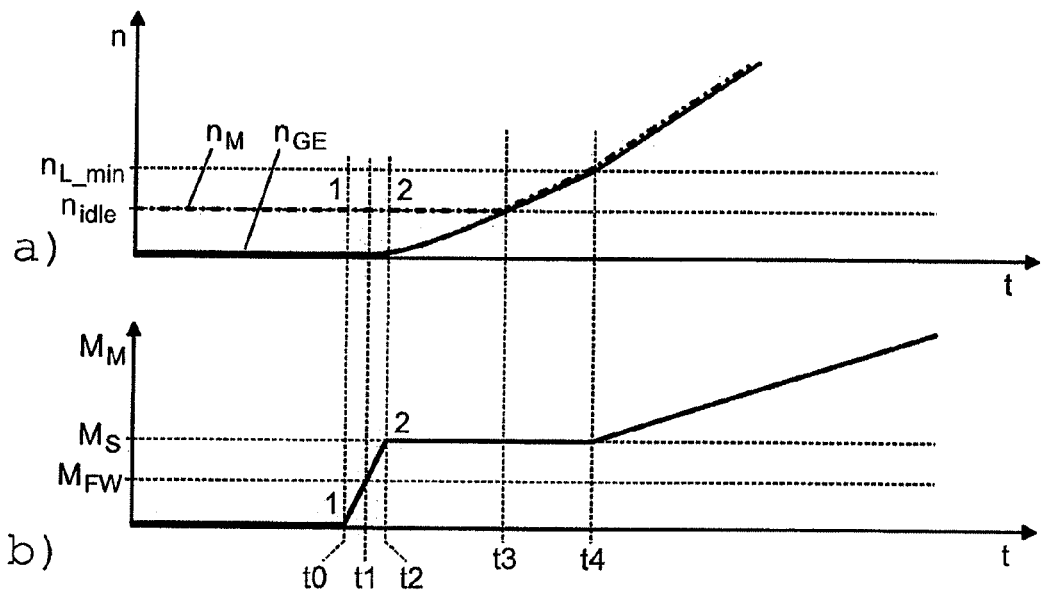

Starting from the idle speed $(n_M=n_{idle})$ and the idle torque $(M_M=M_{idle} \approx 0)$ at time t0 (operating point 1), the engine torque $M_M$ is increased, for example by an increase of the quantity of injected fuel, and simultaneously the friction clutch K is correspondingly engaged. In the process, as shown in FIG. 1, the engine speed $n_M$ is controlled to an engine speed lying slightly above the idle speed $n_{idle}$, thus $(n_M=n_{idle}+\Delta n_M)$ or, as is shown in FIG. 2A, held at the idle speed $n_{idle}$, thus $(n_M=n_{idle})$.

The engine torque $M_M$ is increased rapidly, corresponding to the high torque gradient $dM_M/dt$, until at time t1 the torque initially exceeds the drive resistance torque $M_{FW}$, and consequently the motor vehicle and the input shaft of the stepped transmission G are then accelerated, until the intake torque $M_S$ is attained at time t2 (operating point 2). Then, the motor vehicle and the input shaft of the stepped transmission G is further accelerated at constant engine torque $(M_M=M_S)$, until time t3 when synchronous running is attained at the friction clutch K, and the friction clutch K is completely engaged. The subsequent acceleration of the motor vehicle occurs initially continued with constant intake torque $(M_M=M_S)$, until the internal combustion engine VM, at time t4, exceeds the boost threshold speed $n_{L\_min}$, after which an increased charge pressure builds up and consequently increased engine torque $M_M$ can be generated which causes a faster acceleration of the motor vehicle.

A speed increase $\Delta n_M$ of the engine speed $n_M$ on the order of magnitude of 50 min$^{-1}$ to 100 min$^{-1}$ above the idle speed $n_{idle}$ at operating point 2 in FIG. 1, causes improved running of the drive engine and serves as a control reserve for avoiding a reduction of the engine speed $n_M$ below the idle speed $n_{idle}$, and therefore to avoid a consequential stalling of the drive engine.

If engine torque $M_M$ lying below the intake torque $M_S$ was determined as the startup torque $M_{Anf}$, thus $(M_{Anf} < M_S)$, the setting of the higher intake torque $M_S$ as the startup torque $M_{Anf}$ is nevertheless expedient, $(M_{Anf}=M_S)$, because this accelerates the startup procedure, and the negative effect of the higher startup torque $(M_{Anf}=M_S)$ with respect to load on the friction clutch K is compensated by the positive effect of the shorter duration of slipping.

In contrast, if the determined startup torque $M_{Anf}$ exceeds the intake torque $M_S$ of the drive engine, thus $(M_{Anf} > M_S)$, it is provided according to the invention that the drive engine is initially accelerated up to the boost threshold speed $n_{L\_min}$ or an engine speed $n_M$ lying slightly above the boost threshold speed $n_{L\_min}$, thus $(n_M=n_{L\_min}; n_M=n_{L\_min}+\Delta n_M)$, and is loaded up to the intake torque $M_S$, and then at a largely constant engine speed $(n_M \approx n_{L\_min})$ to nearly the full load torque $M_{VL}(n_{L\_min})$, and that the further speed progression of the drive engine occurs depending on the deviation of the present engine torque $(M_M \approx M_{VL}(n_{L\_min}))$ from the determined startup torque $(M_{Anf})$. A corresponding speed and torque control of the internal combustion engine VM is shown in FIG. 3 in an engine dynamic characteristic map and in the FIGS. 4a) and b) with the respective time progressions of the engine speed $n_M$, the transmission input speed $n_{GE}$, and the engine torque $M_M$, and will be explained in more detail in the following.

Figure 4:
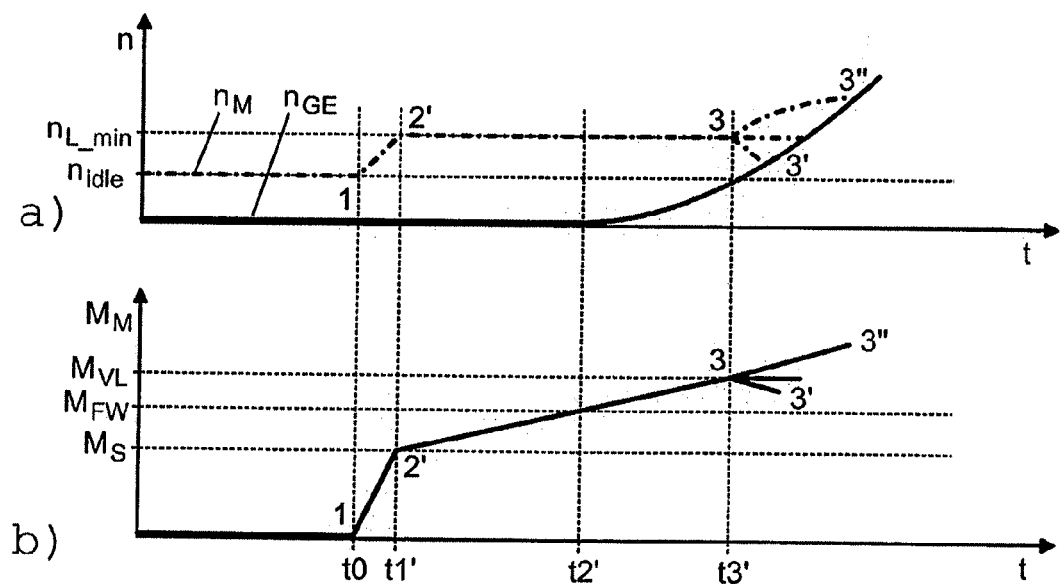

Starting from the idle speed $(n_M=n_{idle})$ and the idle torque $(M_M=M_{idle} \approx 0)$ at time t0 (operating point 1), the engine torque $M_M$ is increased, for instance by an increase in the quantity of injected fuel, and simultaneously the friction clutch K is correspondingly engaged, in order to relatively quickly, that is, with a high torque gradient $dM_M/dt$, attain the intake torque $M_S$ at time t1' (operating point 2') as is shown in FIG. 4, with an engine speed $(n_M=n_{L\_min}+\Delta n_M)$ lying slightly above the boost threshold speed $n_{L\_min}$ or, as is shown in FIG. 4a), with the boost threshold speed ($n_M = n_{L\_min}$).

Figure 3:
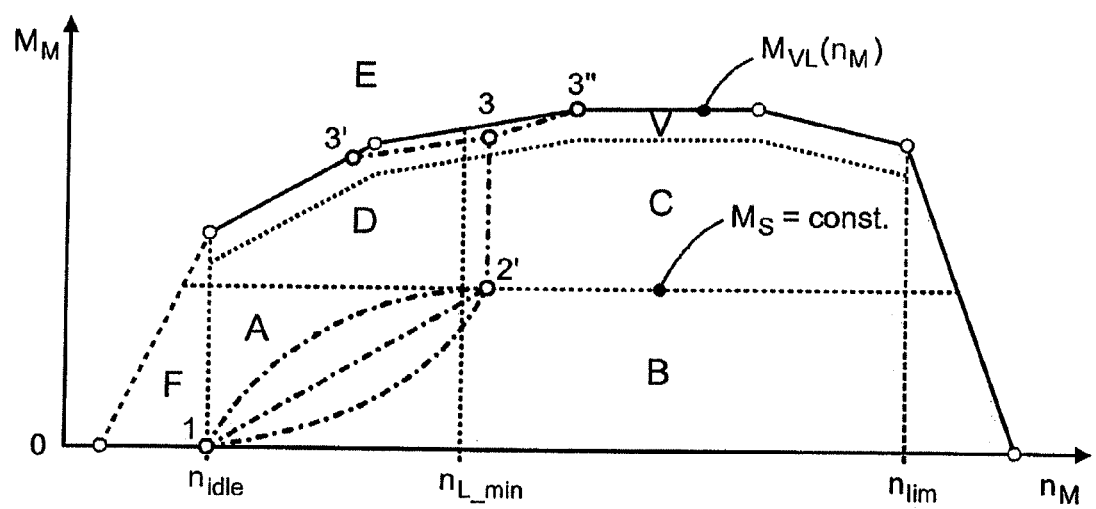

It is pointed out that, using the three curve progressions shown in FIG. 3 between the operating points 1 and 2', the speed and torque progression in this region is arbitrary, however, for acceleration of the startup procedure the progression with the fastest possible attainment of operating point 2' is preferred.

Then the engine torque $M_M$ is increased in conjunction with a corresponding further engagement of the friction clutch K at constant engine speed ($n_M = n_{L\_min} + \Delta n_M$; $n_M = n_{L\_min}$), until the engine torque initially exceeds the drive resistance torque $M_{FW}$ at time t2', and consequently the motor vehicle and the input shaft of the stepped transmission G are accelerated, and until the full load torque $M_{VL}(n_{L\_min})$ is nearly attained at time t3' (operating point 3).

If the present engine torque $M_{VL}(n_{L\_min})$ largely corresponds to the determined startup torque $M_{Anf}$, thus ($M_{Anf} \approx M_{VL}(n_{L\_min})$), the drive engine is held at the present engine speed ($n_M = n_{L\_min}$; $n_M = n_{L\_min} + \Delta n_M$) and the present engine torque ($M_M \approx M_{VL}(n_{L\_min})$) during the slipping phase, until synchronous running arises between the input side and the output side at the friction clutch K, and the clutch is closed completely.

If however, the present engine torque $M_{VL}(n_{L\_min})$ lies significantly above the determined startup torque $M_{Anf}$, thus ($M_{Anf} < M_{VL}(n_{L\_min})$), the drive engine is pushed along the full load characteristic curve $M_{VL}(n_M)$ to a lower engine speed ($n_M < n_{L\_min}$) and lower engine torque ($M_M < M_{VL}(n_{L\_min})$) by further engagement of the friction clutch K, until the specified synchronous running has arisen at the friction clutch K at operating point 3', and the clutch is completely engaged.

In contrast, if the present engine torque $M_{VL}(n_{L\_min})$ lies significantly below the determined startup torque $M_{Anf}$, thus ($M_{Anf} > M_{VL}(n_{L\_min})$), the drive engine is set to a higher engine speed ($n_M > n_{L\_min}$) and higher engine torque ($M_M > M_{VL}(n_{L\_min})$) by an increase of the engine power and a further engagement of the friction clutch K, until synchronous running arises between input side and the output side of the friction clutch K at operating point 3", and the clutch has been completely engaged.

The subsequent acceleration of the motor vehicle occurs then in each case initially with the set full load torque $M_{VL}(n_M)$, before transitioning to a drive control depending on the gas pedal setting and/or the change gradient of the gas pedal setting.

A speed increase $\Delta n_M$ of the engine speed $n_M$ on the order of magnitude of 50 min$^{-1}$ to 100 min$^{-1}$ above the boost threshold speed $n_{L\_min}$ between the operating points 2' and 3 of FIG. 3, serves as a control reserve for avoiding a reduction of the engine speed $n_M$ below the boost threshold speed $n_{L\_min}$, and consequently a decrease of the engine torque $M_M$ to the intake torque $M_S$ is avoided.

The control of the full load torque $M_{VL}(n_{L\_min})$ at operating point 3 is also expedient at lower startup torque ($M_S < M_{Anf} < M_{VL}$), because it can be difficult to regulate the engine torque $M_M$ as constant in this range with decreasing slipping speed $\Delta n_K$ at the friction clutch K, and the negative effect of the increased startup torque ($M_{Anf} \approx M_{VL}(n_{L\_min})$) with respect to the load of the friction clutch is compensated by the positive effect of the shorter duration of slipping.

If the internal combustion engine VM has a variable engine characteristic, which can be given for instance by an actuatable pressure boost system (PBS) with pressurized air injection into the intake tract of the drive engine, the startup control can be modified according to the invention to the respectively present engine characteristic.

Figure 5:
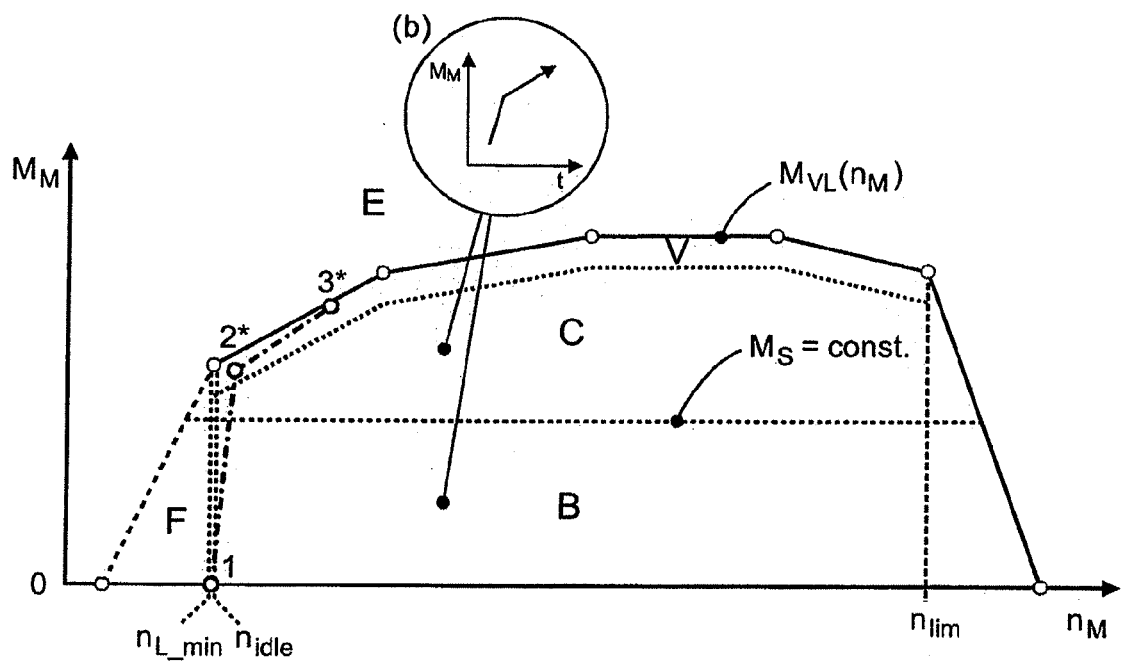

Concerning this, the engine dynamic characteristic map of a turbo-charged internal combustion engine VM with an activated PBS is shown in FIG. 5, using which the boost threshold speed $n_{L\_min}$ is reduced to the idle speed $n_{idle}$ or below the idle speed $n_{idle}$, thus ($n_{L\_min} \leq n_{idle}$). Consequently, the operating regions A and D that would otherwise be present are omitted, and the engine torque $M_M$ of the drive engine can be briefly increased up to the full load torque $M_{VL}(n_M)$, which is represented in a greatly simplified torque progression $M_M(t)$ in the image inset (b) of FIG. 5.

Consequently, according to the appropriate modification of the method according to the invention, the idle speed $n_{idle}$ of the drive engine or an engine speed ($n_M = n_{idle} + \Delta n_M$) lying slightly above the idle speed $n_{idle}$ is determined as the startup speed $n_{Anf}$, thus ($n_{Anf} = n_{idle}$; $n_{Anf} = n_{idle} + \Delta n_M$), and starting from the idle torque ($M_M = M_{idle} \approx 0$) at operating point 1, the respective full load torque $M_{VL}(n_{idle})$ is set in operating point 2*, if the determined startup torque $M_{Anf}$ does not exceed the full load torque $M_{VL}(n_{idle})$ of the drive engine, thus ($M_{Anf} \leq M_{VL}(n_{idle})$). If the respective full load torque $M_{VL}(n_{idle})$ still lies below the determined startup torque $M_{Anf}$, thus ($M_{Anf} > M_{VL}(n_{idle})$), the drive engine, in a manner analogous to the previously described procedure, is adjusted along the full load characteristic curve $M_{VL}(n_M)$ to a higher engine speed ($n_M > n_{idle}$) and higher engine torque ($M_M > M_{VL}(n_{idle})$) (operating point 3*) by an increase of the engine power and a further engagement of the friction clutch, to attain the intended startup torque $M_{Anf}$, thus ($M_M = M_{Anf}$).

REFERENCE CHARACTERS 1 operating point
2 operating point
2' operating point
2* operating point
3 operating point
3' operating point
3" operating point
3* operating point
A operating region
B operating region
C operating region
D operating region
E operating region
F operating region
G stepped transmission, transmission
GA axle transmission, axle differential
K friction clutch, startup element
M torque
$M_{Anf}$ startup torque
$M_{FW}$ drive resistance torque
$M_{idle}$ idle speed torque
$M_K$ clutch torque
$M_M$ engine torque
$M_{max}$ maximum torque
$M_S$ intake torque
$M_{VL}$ full load torque
n speed of rotation
NA auxiliary consumer
$n_{GE}$ transmission input speed
$n_{idle}$ idle speed of rotation
$n_{L\_min}$ boost threshold speed
$n_{lim}$ cut-off speed
$n_M$ engine speed
$n_{max}$ maximum speed
$n_{min}$ minimum speed
PBS pressure boost system PTO power take-off
t time
t0 point in time
t1 point in time
t1' point in time
t2 point in time
t2' point in time
t3 point in time
t3 point in time
t4 point in time
V operating region
VM internal combustion engine, drive engine
$\Delta n_K$ slipping speed
$\Delta n_M$ increase in speed

The invention claimed is:

1. A method for startup control of a motor vehicle, a drive train of which comprises a drive engine built as a turbocharged internal combustion engine (VM), a startup element which is built as an automated friction clutch (K), and a transmission which is built as an automatic stepped transmission (G), with a startup from a stationary state, triggered by activation of a gas pedal, after engagement of a determined startup gear, the drive engine in conjunction with a coordinated engagement of the friction clutch is controlled from an idle speed ($n_{idle}$) to a startup speed ($n_{Anf}$) and from an idle torque ($M_{idle}$) to a determined startup torque ($M_{Anf}$), the method comprising the steps of:
determining a lowest possible engine speed ($n_M$), which can be generated spontaneously under load from the idle speed ($n_{idle}$) depending on dynamic operating properties of the drive engine, and with which the drive engine generates the determined startup torque ($M_{anf}$); and
setting the determined lowest possible engine speed ($n_M$) as the startup speed ($n_{Anf}$).

2. The method according to claim 1, further comprising the step of determining and setting either the idle speed ($n_{idle}$) of the drive engine or an engine speed lying slightly above the idle speed (($n_{idle}$) ($n_M = n_{idle} + \Delta n_M$)), as the startup speed (($n_{Anf}$), ($n_{Anf} = n_{idle}$; $n_{Anf} = n_{idle} + \Delta n_M$)), if the determined startup torque ($M_{Anf}$) does not exceed the intake torque ($M_S$) of the drive engine ($M_{Anf} \leq M_S$).

3. The method according to claim 1, further comprising the step of determining and setting either an operation-dependent minimum speed ($n_{min}$) to be maintained by the drive engine or an engine speed lying slightly above the minimum speed (($n_{min}$), ($n_M = n_{min} + \Delta n_M$)) as the startup speed (($n_{Anf}$), ($n_{Anf} = n_{min}$; $n_{Anf} = n_{min} + \Delta n_M$)), when the operation-dependent minimum speed lies above the idle speed ($n_{idle}$) of the drive engine ($n_{min} > n_{idle}$) if the determined startup torque ($M_{Anf}$) does not exceed the intake torque ($M_S$) of the drive engine ($M_{Anf} \leq M_S$).

4. The method according to claim 1, further comprising the step of initially accelerating the drive engine up to either a boost threshold speed ($n_{L\_min}$) or an engine speed ($n_M$) lying slightly above the boost threshold speed (($n_{L\_min}$), ($n_M = n_{L\_min}$; $n_M = n_{L\_min} + \Delta n_M$)), and loading up the drive engine to the intake torque ($M_S$), and then at a largely constant engine speed ($n_M \approx n_{L\_min}$) to nearly a full load torque ($M_{VL}(n_{L\_min})$), if the determined startup torque ($M_{Anf}$) does not exceed the intake torque ($M_S$) of the drive engine ($M_{Anf} > M_S$)) and the further speed progression of the drive engine occurs depending on a deviation of a present engine torque ($M_M \approx M_{VL}(n_{L\_min})$) from the determined startup torque ($M_{Anf}$).

5. The method according to claim 4, further comprising the step of, when the present engine torque ($M_{VL}(n_{L\_min})$) largely corresponds to the determined startup torque (($M_{Anf}$), ($M_{Anf} \approx M_{VL}(n_{L\_min})$)), maintaining the drive engine at a present engine speed ($n_M = n_{L\_min}$; $n_M = n_{L\_min} + \Delta n_M$) and present engine torque ($M_M \approx M_{VL}(n_{L\_min})$).

6. The method according to claim 4, further comprising the step of, when the present engine torque ($M_{VL}(n_{L\_min})$) lies significantly over the determined startup torque (($M_{anf}$), ($M_{Anf} < M_{VL}(n_{L\_min})$)), reducing the drive engine by further engagement of the friction clutch to a lower engine speed ($n_M < n_{L\_min}$) and lower engine torque ($M_M < M_{VL}(n_{L\_min})$).

7. The method according to claim 4, further comprising the step of, if the present engine torque ($M_{VL}(n_{L\_min})$) lies significantly below the determined startup torque (($M_{Anf}$), ($M_{Anf} > M_{VL}(n_{L\_min})$)), setting the drive engine to a higher engine speed ($n_M > n_{L\_min}$) and higher engine torque ($M_M > M_{VL}(n_{L\_min})$) by increasing engine power and further engagement of the friction clutch.

8. The method according to claim 4, further comprising the step of modifying at least one of the startup speed ($n_{Anf}$), the startup torque ($M_{Anf}$) and the startup gear when an operation-dependent maximum speed ($n_{max}$), to be maintained by the drive engine, is lower than the intended startup speed ($n_{Anf}$) of the drive engine ($n_{max} < n_{Anf}$).

9. The method according to claim 8, further comprising the step of, if the maximum engine torque ($M_M(n_{max})$) that can be set with the maximum speed ($n_{max}$) is sufficient for the startup (thus ($M_M(n_{max}) > M_{FW}$), performing the start-up with the intended startup gear while maintaining the maximum speed ($n_{max}$).

10. The method according to claim 8, further comprising the step of, if the maximum engine torque ($M_M(n_{max})$) that is set with the maximum speed ($n_{max}$) in conjunction with the originally intended startup gear is not sufficient for the startup ($M_M(n_{max}) \leq M_{FW}$), shifting into a lower startup gear before starting the startup procedure, and performing the startup with the lower startup gear, while maintaining the maximum speed ($n_{max}$).

11. The method according to claim 8, further comprising the step of, if the maximum engine torque ($M_M(n_{max})$) that is set with the maximum speed ($n_{max}$) is not sufficient for the startup ($M_M(n_{max}) \leq M_{FW}$), decoupling at least one of auxiliary consumer and a power take-off.

12. The method according to claim 8, further comprising the step of, if the maximum engine torque ($M_M(n_{max})$) that is set with the maximum speed ($n_{max}$) is not sufficient for the startup ($M_M(n_{max}) \leq M_{FW}$) temporarily switching off an assembly requiring the speed to be maintained at the maximum speed ($n_{max}$).

13. The method according to claim 8, further comprising the step of, if the maximum engine torque ($M_M(n_{max})$) that is set with the maximum speed ($n_{max}$) is not sufficient for the startup ($M_M(n_{max}) \leq M_{FW}$)) temporarily exceeding the maximum speed ($n_{max}$).

14. The method according to claim 1, further comprising the step of using the startup control on the portion of the startup torque ($M_{Anf}$), generated by the internal combustion engine in a motor vehicle provided with either a parallel hybrid drive or with a boost drive if, during the startup, either the respective parallel hybrid drive or the boost drive is used in addition to the internal combustion engine.

15. The method according to claim 1, further comprising the step of modifying the startup control with an internal combustion engine with variable engine characteristics to respectively present engine characteristic.

16. A method of controlling a startup of a motor vehicle from a stationary state, the motor vehicle having a drive train comprising a turbo-charged internal combustion engine (VM), an automated startup friction clutch (K), and an automatic stepped transmission (G), the method comprising the steps of:
- initiating the startup from the stationary state of the motor vehicle by activating a gas pedal;
- identifying and engaging a startup gear;
- determining a lowest possible engine speed ($n_M$), in relation to a load generated by the internal combustion engine when operating at an idle speed and depending on dynamic operating properties of the internal combustion engine, at which the internal combustion engine generates a startup torque ($M_{Anf}$);
- defining the lowest possible engine speed ($n_M$) as a startup speed ($n_{Anf}$); and
- coordinating engagement of the friction clutch and control of the internal combustion engine to adjust operation of the internal combustion engine from the idle speed ($n_{idle}$) to the startup speed ($n_{Anf}$) and from an idle torque ($M_{idle}$) to the startup torque ($M_{anf}$).

* * * * *